United States Patent
Hernier et al.

(10) Patent No.: US 8,032,295 B2
(45) Date of Patent: Oct. 4, 2011

(54) PRESSURE-MAINTAINING FUNCTION IN A FULLY HYBRID DRIVE

(75) Inventors: Markus Hernier, Gerlingen (DE); Andreas Greis, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 12/220,215

(22) Filed: Jul. 22, 2008

(65) Prior Publication Data

US 2009/0037080 A1 Feb. 5, 2009

(30) Foreign Application Priority Data

Jul. 31, 2007 (DE) .......................... 10 2007 035 824

(51) Int. Cl.
*G06G 7/70* (2006.01)
*G06G 7/00* (2006.01)
(52) U.S. Cl. ........................................ 701/112; 123/463
(58) Field of Classification Search .................. 701/103, 701/104, 112; 123/456, 447, 495, 457, 458, 123/459, 463, 179.4, 179.3, 198 D; 180/65.21
See application file for complete search history.

(56) References Cited

U.S. PATENT DOCUMENTS

| | | | | |
|---|---|---|---|---|
| 5,878,718 | A * | 3/1999 | Rembold et al. | 123/456 |
| 2006/0116797 | A1 | 6/2006 | Moran | |
| 2006/0162324 | A1 * | 7/2006 | Pott et al. | 60/299 |
| 2006/0207567 | A1 | 9/2006 | Yamaguchi et al. | |
| 2006/0212212 | A1 * | 9/2006 | Akasaka | 701/112 |
| 2007/0074504 | A1 * | 4/2007 | Driscoll et al. | 60/285 |
| 2007/0181088 | A1 * | 8/2007 | Akasaka | 123/179.4 |

FOREIGN PATENT DOCUMENTS

| | | |
|---|---|---|
| DE | 100 060861 | 11/2000 |
| DE | 10 2005 003 880 | 7/2006 |
| DE | 10 2005 040 783 | 3/2007 |
| EP | 1 795 423 | 6/2007 |
| JP | 2000-64874 | 2/2000 |

* cited by examiner

*Primary Examiner* — Mahmoud Gimie
(74) *Attorney, Agent, or Firm* — Kenyon & Kenyon LLP

(57) ABSTRACT

A method for maintaining and/or adjusting a system pressure in a fuel injection system of an internal combustion engine, in which the internal combustion engine is a part of an hybrid power train, which includes in addition at least one further drive. A system pressure in a reservoir element of the fuel injection system is monitored using a pressure sensor. In operating modes in which the internal combustion engine is shut down and/or is separated from the hybrid power train, the maintaining or the adjusting of the system pressure takes place via a pressure-regulating valve. The activation of the pressure-regulating valve takes place directly or indirectly via a control unit or a vehicle control unit or a clutch control unit.

13 Claims, 3 Drawing Sheets

PRESSURE-MAINTAINING FUNCTION IN A FULLY HYBRID DRIVE

FIELD OF THE INVENTION

The present invention relates to a method and device for maintaining or adjusting a system pressure in a fuel injection system of an internal combustion engine, which is a part of a hybrid power train, which includes at least one additional drive.

BACKGROUND INFORMATION

Hybrid drives for motor vehicles are being increasingly developed at this time, in which the hybrid drive is implemented in that, in addition to the internal combustion engine of the vehicle, a further drive, such as an electrical drive, is built in. The usefulness of this development lies mainly in the reduction of fuel usage and the low emissions of such drives. In hybrid drives, hydraulic drives are also used as additional drives, besides electrical machines. The use of hydraulic drives extends in a heavily concentrated way to construction equipment, fork lift trucks and military applications.

Besides combustion engines having externally supplied ignition, drives may also include self-igniting internal combustion engines, such as a Diesel engine. The injection of fuel into the combustion chambers of self-igniting internal combustion engines, such as Diesel engines, is made via high pressure injection systems such as high-pressure reservoir injection systems (common-rail). These fuel injection systems consequently represent a component of hybrid power trains. Vehicles that include a hybrid drive, which as an internal combustion engine includes a Diesel engine, may get into driving situations, such as purely electrical operation, start-stop situations or recuperation operation in which the actual pressure (actual system pressure) prevailing in the high-pressure reservoir (common-rail) does not agree with the setpoint system pressure of the respective driving situation of a conventional drive, that is, a power train having only an internal combustion engine, in this case a Diesel engine.

In the state of development reached today, with respect to high-pressure reservoir injection systems, such as a common-rail injection system, pressure-maintaining functions are already being used in internal combustion engine stop-start functions. For this purpose, immediately before shutting down the internal combustion engine in vehicle stopping phases, the fuel pressure in the high-pressure reservoir (common-rail) is not reduced, but is kept in reserve using a pressure-maintaining valve, so that when there is a restart of the internal combustion engine, the required fuel pressure-injection pressure in the high-pressure part of the high-pressure reservoir injection system is directly, or rather very rapidly available. Because of the pressure-maintaining valve, which is associated with the high-pressure reservoir, the pressure prevailing in the high-pressure reservoir is able to be maintained in the ideal case, and consequently the system pressure is able to be maintained. If a creeping pressure loss takes place, this will be very slight, so that the required system pressure will be able to be built up again very rapidly by the high-pressure pump applied to the high-pressure reservoir (common-rail). Very short starting times of the internal combustion engine are necessary for the acceptance of stop-start systems on the part of the user in the vehicle.

While a method for controlling a vehicle drive unit is discussed in German patent document DE 10 2005 040 783 A1, in which a continual comparison is made between an overall actual torque and an admissible overall torque, a system pressure monitoring in high-pressure reservoirs using a pressure-maintaining valve is already known from the related art, to be sure, but a situation-dependent pressure adjustment, as may occur within the scope of hybrid drives, such as during the transition from purely electrical driving or from recuperation operation to normal internal combustion engine operation, is not available yet.

German patent document DE 10 20005 040 783 A1 relates to the continual comparison of an overall actual torque to an admissible overall torque, the overall actual torque being calculated from individual actual torques of at least two individual engines and the admissible overall torque being calculated from admissible individual torque values of the at least two individual engines, and then a fault reaction being initiated if the comparison reveals that the overall actual torque is greater than the admissible overall torque. These design approaches known from the related art relates only to an admissible overall torque. Whereas in stop-start systems in conventional vehicle drives, the restart of the internal combustion engine, be it a self-igniting internal combustion engine or one having externally supplied ignition, takes place in driving situations in which no load, or rather a small load has to be raised, in vehicles equipped with hybrid drives, a restart of the internal combustion engine is executed also at high loads, and thus also higher fuel setpoint pressures in the fuel accumulator injection system (common-rail).

SUMMARY OF THE INVENTION

It is provided according to the exemplary embodiments and/or exemplary methods of the present invention, especially for leakage-free fuel injection systems (common-rail) in which the high-pressure reservoir element is equipped with a pressure regulating valve, to keep the system pressure in the high-pressure reservoir (common-rail) as high as possible in phases in which, as a rule, the self-igniting internal combustion engine is decoupled from the power train with the aid of a clutch.

Thereafter, it is provided, according to the exemplary embodiments and/or exemplary methods of the present invention, to adjust the system pressure in the high-pressure reservoir element to the pressure requirement that is adjusted to the current driving situation, immediately before reengaging the clutch of the self-igniting internal combustion engine. In case a pressure reduction is required, this may be made by operating the pressure regulating valve. In the case of a required system pressure increase in the high-pressure reservoir element (common-rail), however, the pressure regulating valve remains closed. In this case, the system pressure may be built up with the aid of the high pressure pump that generates the system pressure in the high-pressure reservoir element (common-rail).

The control of the pressure regulating valve is able to take place by a separate control unit or even by the engine control unit or the clutch control unit. The control units mentioned should, however, communicate with one another in such a way that relevant hybrid-specific vehicle functions, such as opening a clutch between the internal combustion engine and a further additional drive, such as an E drive that is installed in a parallel hybrid power train, is detected, and is possibly prepared, using a software function, as signal for the activation or non-activation of the pressure regulating valve that is associated with the high-pressure reservoir.

In one electrical hybrid drive, in a power train designed as parallel hybrid, an internal combustion engine, in the present case a self-igniting internal combustion engine, such as a Diesel engine, as well as an additional drive, in this case an E drive, are operated at the same rotational speed. For the sake of completeness, it should be mentioned that the exemplary embodiments and/or exemplary methods of the present invention may also be used for other internal combustion engines, such as direct-injection Otto engines having virtually leakproof injectors, as well as that in place of the E drive used here as a hybrid drive, a hydraulic drive merits consideration.

In the recuperation case, the kinetic energy inherent in the vehicle reaches at least one E drive via the drive axle that is in this case working in the operating mode of generator, the internal combustion engine being mechanically separated from the power train in this operating phase. This takes place via a clutch. The at least one additional E drive and a high-voltage battery associated with it are dimensioned in such a way that they are able to absorb the high power that arises in short time intervals. The high-power electronics system having an AC/DC converter takes care of a possibly required preparation of the electrical energy generated by the at least one additional drive, in this case at least one E drive, so that it is able to be stored as direct current of a specified quality in the high-voltage battery. Furthermore, in the case of a hybrid drive in recuperation mode, a 14 Volt vehicle electrical system is able to be supplied by the high-voltage battery, which takes place via a DC/DC converter.

The hybrid drive power train is advantageously designed as a parallel hybrid drive, and may include one or two clutches. In the specific embodiment of the parallel hybrid drive having two clutches, a first clutch is located between the at least one additional E drive and the vehicle transmission, while the second clutch is located between the combustion engine developed as a self-igniting internal combustion engine and the at least one additional drive, in this case an E drive. In hybrid drives whose internal combustion engine has a starter associated with it, the first clutch between the at least one additional E drive and the vehicle transmission may be omitted. Using a parallel hybrid drive which, as described above, includes, for instance, two clutches, during the driving process it is possible to separate the internal combustion engine mechanically from the power train, which takes place via the second clutch provided in the parallel hybrid drive. Because of this, greater kinetic energy may be recovered using the hybrid components, that is, in the recuperation mode may be transmitted via the mechanical components to the at least one additional E drive, and used for loading, for instance, the high-voltage battery and for feeding the 14 Volt vehicle electrical system.

As soon as the self-igniting internal combustion engine has been separated from the at least one additional E drive via the second clutch, the actual system pressure in the high-pressure injection system (common-rail) changes in comparison to the setpoint system pressure. This state is not only able to occur during the clutching processes which, as a rule, last a short time, but also during holding phases and during comparatively longer electrical driving phases, in which the system pressure built up in the high-pressure reservoir (common-rail) abates in a creeping manner.

During idling of the internal combustion engine, the system pressure, that is kept in reserve in the high-pressure reservoir element (common-rail), corresponds to a first pressure level. In the pressure-maintaining function for conventional stop-start systems, the pressure regulating valve associated with the high-pressure reservoir has to maintain the system pressure as well as possible, with the aid of a function stored in its electronic control, for the time of the engine stop, that is, the time span during which the internal combustion engine is shut down. During operation of the vehicle having a self-igniting internal combustion engine, a specified system pressure is present in the high-pressure reservoir element; in the latter, a second pressure level prevails. As soon as the self-igniting internal combustion engine is decoupled from the parallel hybrid power train and a driving phase of purely electrical driving or a recuperation phase begins, or the vehicle stops, the pressure-regulating valve, which is associated with the high-pressure reservoir element, is activated in such a way that the system pressure in the high-pressure reservoir element is maintained and cannot escape. The corresponding control signal for this procedure to the pressure-regulating valve goes out either from the electronic valve control or from the vehicle control unit or the clutch control unit.

As soon as the self-igniting internal combustion engine in the parallel hybrid power train is switched in again and the pressure in the high-pressure reservoir element (common-rail) differs from the setpoint system pressure of the current operating point of the self-igniting internal combustion engine, the prevailing system pressure can be rapidly adjusted with the aid of the pressure-regulating valve. In case the setpoint system pressure in the high-pressure reservoir element (common-rail) is lower than the current pressure in the high-pressure reservoir element, the pressure-regulating valve is opened until the setpoint system pressure is reached. If the setpoint system pressure in the high-pressure reservoir element (common-rail) is higher than the current pressure in the high-pressure reservoir element, the pressure-regulating valve remains closed until a specified setpoint system pressure has been reached.

In conventional drives, in which only one internal combustion engine is used, the pressure-regulating valve is controlled by the engine control unit. During operation, a vehicle equipped with a hybrid drive having at least one electrical machine, coordination is required of the combustion engine with the at least one electrical machine, and this takes place in the vehicle control unit (VCU). The pressure-regulating valve associated with the high-pressure reservoir element (common-rail), following the provided design approach according to the exemplary embodiments and/or exemplary methods of the present invention, besides being controlled by its electronic control unit, may be controlled directly by the vehicle control unit (VCU) or by a clutch control unit (CCU). Another possibility is represented by passing on the signal from the clutch control unit or the vehicle control unit to the electronic control of the pressure-regulating valve. The actual control takes place, in this case as in the conventional, that is, non-hybrid drive, without at least one additional further electric machine, with the aid of the electronic control unit of the pressure-regulating valve.

The exemplary embodiments and/or exemplary methods of the present invention is explained below in greater detail on the basis of the drawings.

DETAILED DESCRIPTION

Figure 1:
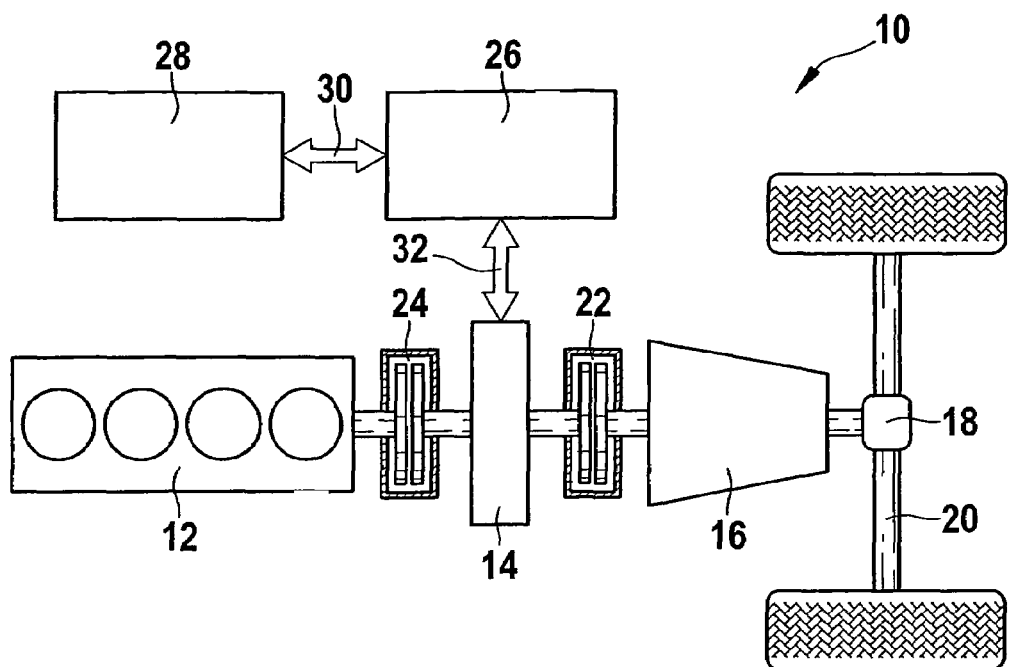
FIG. 1 shows a representation in principle of an hybrid power train, developed here as a parallel hybrid power train.

In the representation in FIG. 1 one may see an hybrid power train for a motor vehicle, the hybrid power train shown in FIG. 1 being developed as a parallel hybrid power train.

As is shown in FIG. 1, a hybrid power train 10 includes an internal combustion engine 12. Internal combustion engine 12 may be implemented either as an internal combustion engine having externally supplied ignition, such as a directly injecting Otto engine (BDE), or as a self-igniting internal combustion engine, such as a Diesel engine, which is supplied with fuel via a high-pressure reservoir injection system 96 (cf. illustration in FIG. 3). The following description relates to internal combustion engine 12, which is developed as a self-igniting internal combustion engine and is supplied with fuel via a high-pressure reservoir injection system 96.

Hybrid power train 10 according to the illustration in FIG. 1, besides internal combustion engine 12 includes at least one E drive 14. The at least one E drive 14 cooperates with a vehicle transmission 16, while a first clutch 22 is connected between them, and the vehicle transmission, for its part, acts on an axle drive 18. A powered axle 20, that is shown only schematically in this instance, is driven by axle drive 18.

Hybrid power train 10, that is designed in the representation according to FIG. 1 as a parallel hybrid power train, besides the already mentioned first clutch 22, between the at least one E drive 14 and transmission 16, includes an additional, second clutch 24. In the recuperation case, the vehicle motion energy reaches the at least one E drive 14, operated in generator mode, via drive axle 20 and vehicle transmission 16 acted upon in the opposite direction, and closed first clutch 22. In this operating phase, internal combustion engine 12 is mechanically separated from power train 10 by second clutch 24 being open. The at least one E drive 14 and a high-voltage battery 26 associated with it are dimensioned in a size at which they are able to absorb the high powers of the vehicle movements that arise in short time intervals, that is, in the recuperation case, they are able to store the energy fed in via the at least one E drive 14. A high-power electronic system, which includes, on the one hand, at least one AC/DC converter 32 and, on the other hand, at least one DC converter 30, ensures a necessary preparation of the electric energy generated by the at least one E drive 14, so that it may be fed into the at least one high-voltage battery 26 as direct current of a defined quality. Furthermore, in a hybrid drive, a vehicle electrical system (14 Volt onboard electrical system), that is not shown in FIG. 1, is able to be supplied by high-voltage battery 26. In the illustration as in FIG. 1, the vehicle electrical system could be equated to low-voltage battery 28.

Via second clutch 24, between internal combustion engine 12 and the at least one E drive 14, it is possible during the driving process to separate internal combustion engine 12 mechanically from hybrid power train 10, so that greater kinetic energy is able to be absorbed by the hybrid components and converted to electrical energy. As soon as internal combustion engine 12 is separated from the at least one E drive 14 via second clutch 24, an actual system pressure changes within a high-pressure reservoir element 44 (cf. FIG. 3) of the high-pressure reservoir injection system 96 in comparison to a specified setpoint system pressure. This condition, as a rule, does not only occur during short clutching processes but also during holding phases of the motor vehicle and during comparatively longer electrical driving phases.

Figure 2:
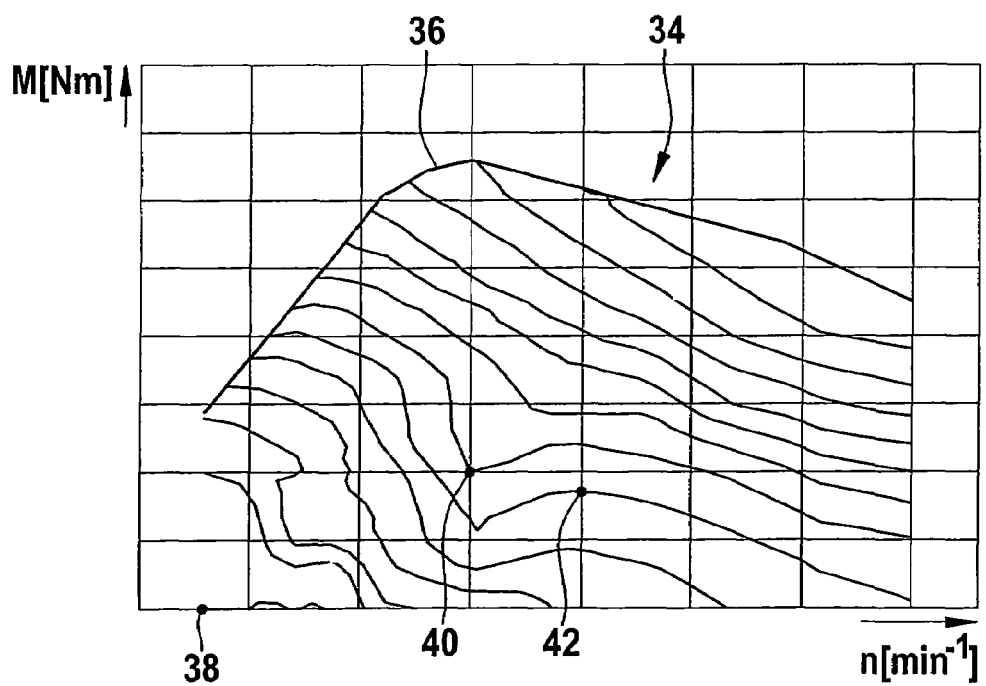
FIG. 2 shows a characteristics map of the system pressure within a high-pressure reservoir element (common-rail), plotted over load and rotational speed of the internal combustion engine.

FIG. 2 shows the characteristics map of a system pressure prevailing in the high-pressure reservoir element (common-rail) of a high-pressure reservoir element injection system, plotting the rotational speed and the load of an internal combustion engine.

As may be seen in FIG. 2, a pressure, shown by reference numeral 38 in characteristics map 34, according to the illustration in FIG. 2, corresponds to a system pressure at idling of the internal combustion engine. This state of internal combustion engine 12 is characterized by a low idling speed and a load close to zero. In the pressure-maintaining function for stop/start systems implemented usually in conventional internal combustion engines, particularly in self-igniting internal combustion engines having a high-pressure reservoir injection system, a pressure-regulating valve 48 (cf. representation according to FIG. 3) is held in pressure-maintaining function mode for the time of an engine stop, that is, at shut-down internal combustion engine 12, so that the system pressure prevailing in high-pressure reservoir element 44 of high-pressure reservoir injection system 96 is maintained as long as possible, and no creeping pressure loss sets in.

When the motor vehicle is operated using internal combustion engine 12, there is a specified system pressure in high-pressure reservoir element 44, that is identified in characteristics map 34, according to FIG. 2, by 40. As soon as the internal combustion engine is decoupled from hybrid drive train 10, and a purely electrical phase follows, for instance, or a recuperation phase begins, or the vehicle stops, pressure-regulating valve 48 is activated in such a way that the pressure in high-pressure reservoir element 44 cannot escape. In this case, pressure-regulating valve 48 takes over the pressure-maintaining function. The command for this function is able to originate either from a control unit 68 (EDC) or a vehicle control unit 82 (VCU), or even from a clutch control unit 78 (CCU). In characteristics map 34 according to the illustration in FIG. 2, the system pressure, which sets in high-pressure reservoir element 44 shortly before the shutting down of internal combustion engine 12, or shortly before its decoupling from hybrid drive train 10 by the operation of second clutch 24, is identified by reference numeral 40.

Now, if the purely electrical driving phase or the recuperation phase is ended, and if internal combustion engine 12 is to be switched in again, and if it is recorded using a pressure sensor 46, that the system pressure in high-pressure reservoir element 44 differs from the setpoint value of the system pressure at the time of the current operating point of the internal combustion engine, the system pressure is able to be post-controlled very rapidly by activating pressure-regulating valve 48. If it is detected via pressure sensor 46 that a setpoint system pressure 42, which corresponds to the current operating point of internal combustion engine 12, and the pressure in high-pressure reservoir element 44 is lower, pressure-regulating valve 48 is closed and a pressure buildup takes place until the setpoint system pressure is reached. In the opposite case, that is, when the setpoint system pressure in the high-pressure reservoir element 44 (common-rail) is higher than the current, actual pressure prevailing in high-pressure reservoir element 44, pressure-regulating valve 48 is opened and fuel is let out until the setpoint system pressure has been attained.

For the sake of completeness, it should be mentioned that the full-load characteristics curve of internal combustion engine 12 in characteristics map 34 is denoted by reference numeral 36 in the illustration in FIG. 2.

Figure 3:
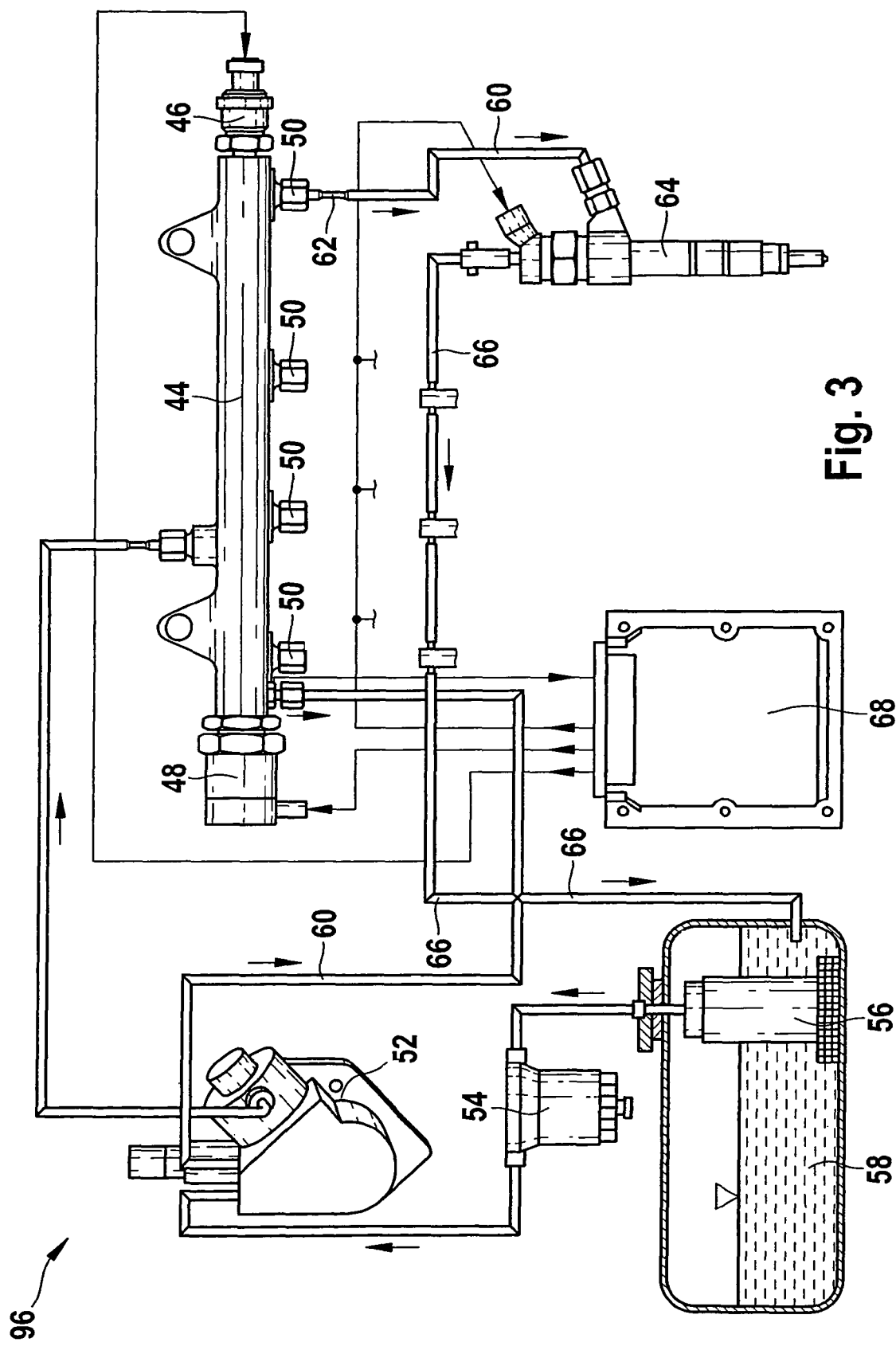
FIG. 3 shows a high-pressure reservoir injection system having a pressure-regulating valve.

FIG. 3 shows the schematic construction of a high-pressure reservoir injection system for the fuel supply of self-igniting internal combustion engines.

High-pressure reservoir injection system 96 includes high-pressure reservoir element 44 (common-rail), developed as a rule as a welded component or a forged component. High-pressure reservoir element 44 is developed as a tubular elongated component and has a number of connecting nipples 50. The number of connecting nipples corresponds to the number of fuel injectors 64 that are to be supplied with fuel that is under system pressure. Besides those, as shown in the drawing in FIG. 3, at the circumference of high-pressure reservoir element 44 that is tubular, as a rule, a connecting nipple is provided at which a high-pressure line 60 is connected that comes from high-pressure conveying pump 52 which supplies it. Furthermore, at an end face of high-pressure reservoir element 44 (common-rail), that is tubular as a rule, there is pressure-regulating valve 48, and on the end face of high-pressure reservoir element 44 opposite to this, there is a pressure sensor 46.

The system pressure in high-pressure reservoir element 44 is generated via high-pressure pump 52 that was mentioned. A fuel filter 54 is preconnected to this. Fuel filter 54, in turn, is postconnected to an electrical fuel pump 56, which aspirates the fuel from a tank 58. A return line 66 opens out into tank 58, into which a controlled quantity that is shut off from fuel injectors 64 is conveyed back into the tank, as, for example, in response to pressure relief of fuel shut off from control spaces, or leakage.

In FIG. 3 it may be seen that pressure-regulating valve 48 and pressure sensor 46 that is associated with high-pressure reservoir element 44 (common-rail) are connected to control unit 68 (EDC). The pressure maintenance function is transmitted to pressure-regulating valve 48 via the activation using the corresponding signal from control unit 68 (EDC). The pressure respectively prevailing in high-pressure reservoir element 44 is recorded by pressure sensor 46 and is transmitted to control unit 68 (EDC) via the signal line shown in FIG. 3.

With that, it is possible, via control unit 68 (EDC) to open a pressure-regulating valve 48 counter to a pressure maintenance function, so that fuel escapes from high-pressure reservoir element 44 into fuel tank 58; on the other hand, because of the corresponding activation of pressure-regulating valve 48, an increase in the system pressure in high-pressure reservoir element 44 is possible via control unit 68 (EDC) if pressure-regulating valve 48 is activated into the pressure-maintaining function mode. In this case, the pressure increase in high-pressure reservoir element 44 takes place because of its being acted upon by high-pressure pump 52.

Figure 4:
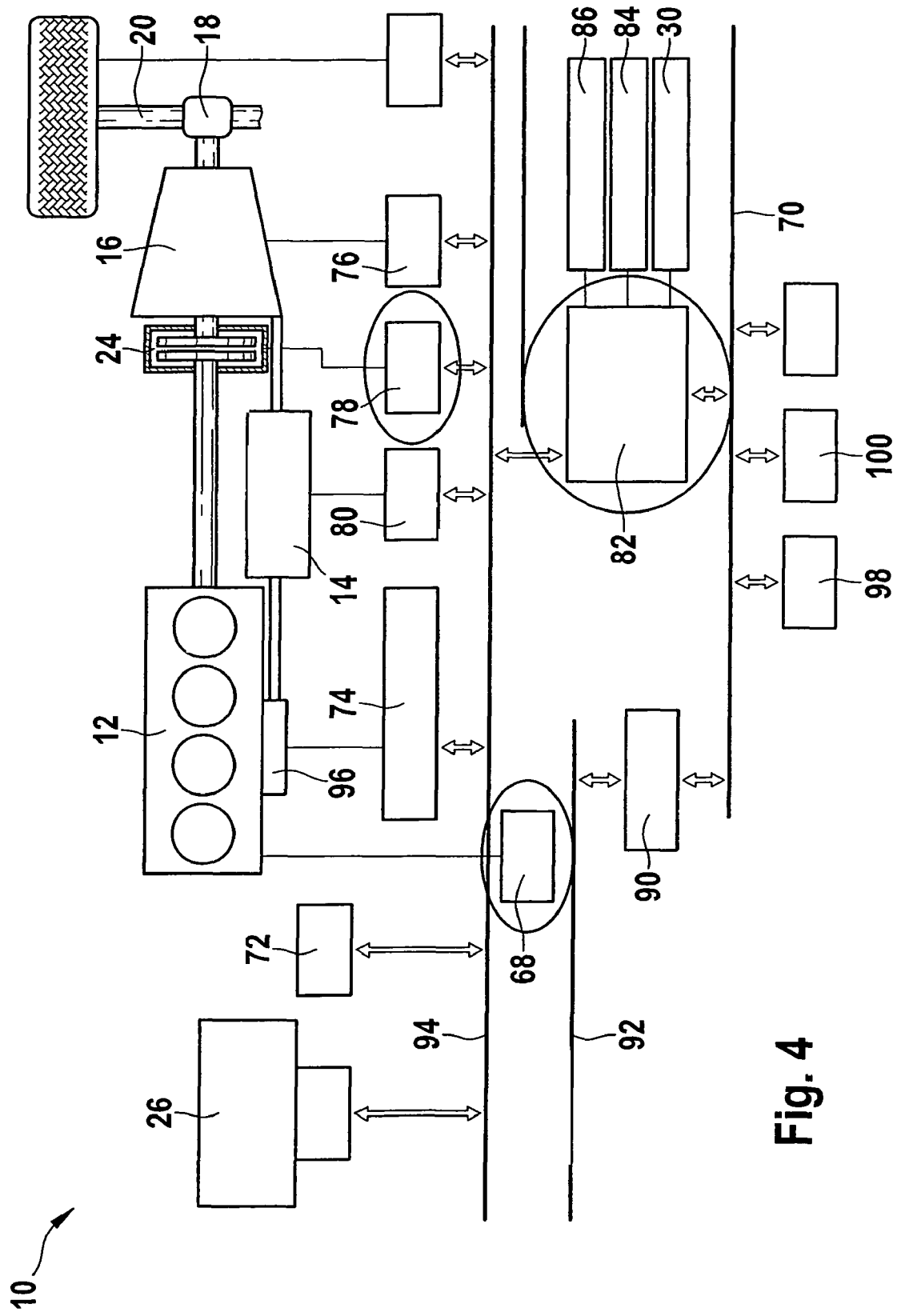
FIG. 4 shows the linkage of hybrid components of a hybrid drive for a vehicle using its CAN vehicle bus.

FIG. 4 shows an hybrid drive train 10, having an internal combustion engine and at least one clutch that separates internal combustion engine 12 and the at least one E drive 14 from each other. First clutch 22 (cf. FIG. 1) may, for instance, be built into drive 16, or may not be present at all.

It may further be seen in the illustration in FIG. 4 that the first or second clutch 22 or 24 is located between transmission 16, depending on the specific embodiment having a double clutching transmission and internal combustion engine 12.

The at least one E drive 14 is directly coupled to transmission 16 and drives it on the input side. At the output side, transmission 16 acts upon axle drive 18 which, on its part, drives drive axle 20 of hybrid drive train 10. Furthermore, in drive train 10 according to FIG. 4, traction battery 26 is shown which, as a rule, involves a high-voltage battery. Reference numeral 72 indicates a vehicle electrical system designed as a 14 volt vehicle electrical system.

Reference numeral 70 denotes a series CAN, a vehicle bus, via which signals or control pulses, that are to be exchanged between individual control units, are transmitted. As may be seen in FIG. 4, the CAN bus denoted by reference numeral 70 includes, for instance, interfaces to an ESP system 98 or an ASR system 100. The CAN bus is able to be connected to a gateway CAN bus 92 via a gateway 90. The assemblies are connected to vehicle control unit (VCU) 82 via a hybrid CAN bus 94. Gateway CAN bus 92 connects control unit 68 to vehicle control unit 82. In the case of conventional drives, CAN bus 70, that is provided in series form, takes over the communication between the assemblies and vehicle control unit 68.

Series CAN 70, that is equipped with interfaces to components in ESP system 98 or ASR system 100, also communicates with a vehicle control unit 82 via gateway 90. A connection to control unit 68, which communicates with a hybrid CAN bus 94 (cf. reference numeral 94) is able to be created via gateway 90. Hybrid CAN bus 94 takes over the signal exchange and the control exchange to traction battery 26 and to vehicle electrical system 72, for instance, when vehicle electrical system 72, in the purely electrical driving operation, is able to be fed via the generatorically driven at least one E drive 14. As may be seen in FIG. 4, control unit 68 communicates with high-pressure reservoir injection system 96 to supply internal combustion engine 12, the individual components of high-pressure reservoir injection system 96, in particular, pressure-regulating valve 48 that is associated with high-pressure reservoir element 44 and pressure sensor 46 associated with high-pressure reservoir element 44 being left out of FIG. 4 for the sake of clarity (however, cf. FIG. 3). The control of an air conditioning system compressor (cf. reference numeral 74) takes place via a hybrid CAN bus 94. FIG. 4 further shows that at least one E drive 14 has a separate control unit 80, just as does clutch 24. In the illustration in FIG. 4, the embodiment variant of a parallel hybrid drive is shown by a double clutching transmission.

Clutch 24 is controlled via a clutch control device indicated as reference numeral 78; furthermore, a transmission control unit (GCU) 76 is associated with transmission 16 of hybrid power train 10. For the sake of completeness, it should be mentioned that vehicle control unit 82 has a signal exchange respectively with an driving value sensor 86 and a control unit for cooling system 84, and regulates DC controller 30 (cf. illustration according to FIG. 1) between the vehicle electrical system and high voltage battery 26, to name an example.

In the illustration according to FIG. 4, control unit 68 and clutch control unit 78 are emphasized. Via these two control units 68, 78, pressure-regulating valve 48, via which the pressure-maintaining function is able to be implemented at high-pressure reservoir element 44, may be controlled. Control unit 68 was mentioned already in connection with the description of FIG. 3. The control of second clutch 24, for example, which separates internal combustion engine 12 from the at least one E drive, can take place via clutch control unit 78 that is shown in FIG. 4. Depending on the closed position of clutch 24, it may be detected whether internal combustion engine 12 is coupled to hybrid drive train 10 or is decoupled from it. Via this signal, which is present in clutch control unit 78, pressure-regulating valve 48 is able to be activated in such a way that the pressure in high-pressure reservoir element 44 is not able to escape, and a pressure-maintaining function is activated. The command for this procedure may originate either with control unit 68, as was described above, or with engine control unit 82 or clutch control unit 78, that was already mentioned. Shortly before the switching in of internal combustion engine 12, that is, towards the end of the purely electrical driving operating phase, or towards the end of the operating phase of recuperation operation, the system pressure currently prevailing in high-pressure reservoir element 44 may be adjusted, namely, in such a way that, in response to too high a system pressure in high-pressure reservoir element 44, fuel is controlled away from it into tank 58, or in response to too low a system pressure in high-pressure reservoir element 44, a buildup of the system pressure takes place in it via high-pressure pump 52.

As shown in the illustration in FIG. 4, there are accordingly several possibilities or activating pressure-regulating valve 48. Besides control unit 68, vehicle control unit 82 and clutch control unit 78 are also suitable for this. Another possibility is passing on the signal from clutch control unit 78 and of vehicle control unit 82 to control unit 68. The actual control, in this case, takes place directly with the aid of control unit 68, in the case of conventional power trains, that is, in power trains without hybrid components.

Even though the hybrid power train, shown in FIGS. 1 and 4, was described with the aid of at least one additional E drive 14, it is of course possible to provide hybrid power train 10, be it a simple hybrid power train or a parallel hybrid power train, as shown in FIG. 1, instead of with at least one E drive 14, with a hydraulic drive instead of an E drive. According to statements made above, internal combustion engine 12, besides being designed as a self-igniting internal combustion engine having a high-pressure reservoir pressure system 96, may also be designed as a direct-injecting Otto engine having leakage-free fuel injectors 64. In these concepts of internal combustion engines, the implementation of system pressure monitoring, as proposed in the exemplary embodiments and/or exemplary methods of the present invention, may also be used in a fuel reservoir or fuel distributor and its adjustment, as a function of the operating point of internal combustion engine 12.

What is claimed is:

1. A method for adjusting a system pressure in a fuel injection system of an internal combustion engine, which is a part of a hybrid power train of a vehicle, which includes at least one additional drive, the method comprising:
    (a) continually monitoring, using a pressure sensor, a system pressure level in a high-pressure reservoir element of the fuel injection system;
    (b) in operating modes in which the internal combustion engine is at least one of (i) temporarily shut down as part of a stop/start control with continuing vehicle operation and (ii) separated from the hybrid power train, the adjusting of the system pressure occurs via a pressure-regulating valve enabled to provide both a selective increase in the system pressure and a selective decrease in the system pressure; and
    (c) activating the pressure-regulating valve via one of a control unit, a vehicle control unit and a clutch control unit.

2. The method of claim 1, wherein before a recoupling of the internal combustion engine into the hybrid power train, the system pressure in the fuel injection system is adjusted to a setpoint system pressure, which is a function of the current internal combustion engine operating point at a time of the recoupling.

3. The method of claim 2, wherein the pressure-regulating valve remains closed when the setpoint system pressure in the high-pressure reservoir element is undershot, and a pressure buildup in the high-pressure reservoir element occurs via a high-pressure pump.

4. The method of claim 2, wherein the pressure-regulating valve is opened when the setpoint system pressure in the high-pressure reservoir element is exceeded, and fuel flows off in a return flow.

5. The method of claim 1, wherein, when the internal combustion engine is decoupled from the hybrid power train, the pressure-regulating valve is activated via the one of the clutch control unit, the control unit and the vehicle control unit so that a pressure-maintaining function implemented in the pressure-regulating valve is activated.

6. The method of claim 1, wherein the pressure-regulating valve is one of (i) activated directly via the one of the control unit and via the clutch control unit, and (ii) activated indirectly via the one of the vehicle control unit and the clutch control unit.

7. The method of claim 1, wherein the adjusting of the system pressure occurs via a pressure-regulating valve in operating modes in which the internal combustion engine is separated from the hybrid power train.

8. The method of claim 1, wherein the at least one additional drive is an electric motor configured to drive the hybrid power train.

9. A hybrid power train comprising:
    an internal combustion engine;
    at least one additional drive; and
    at least one clutch;
    wherein the internal combustion engine is a self-igniting internal combustion engine which includes a high-pressure reservoir injection system, whose high-pressure reservoir element has a pressure-regulating valve which is enabled to provide both a selective increase and a selective decrease in a system pressure in the high-pressure reservoir element as a function of a setpoint system pressure that is present before a recoupling into the hybrid power train for the current operating point of the internal combustion engine.

10. The hybrid power train of claim 9, wherein the hybrid power train is a parallel hybrid power train, and it includes a first clutch between the at least one drive and the vehicle transmission, and a second clutch between the at least one drive and the internal combustion engine.

11. The hybrid power train of claim 9, wherein one of (i) the pressure-regulating valve, which is associated with the high-pressure reservoir element of the fuel injection system, is activated directly either via one of a control unit and a clutch control unit for the second clutch, and (ii) the pressure-regulating valve is activated indirectly via the vehicle control unit via the clutch control unit which, on their part, activate the control unit.

12. The hybrid power train of claim 9, wherein at least one high-voltage battery is electrically connected via at least one DC/DC converter to at least one of a low-voltage battery and a vehicle electrical system, and electrical energy is fed into the at least one high-voltage battery in an operation mode recuperation operation.

13. The hybrid power train of claim 9, wherein the at least one additional drive is an electric motor configured to drive the hybrid power train.

* * * * *